United States Patent
Medvedovsky et al.

(10) Patent No.: US 10,523,693 B2
(45) Date of Patent: Dec. 31, 2019

(54) SYSTEM AND METHOD FOR REAL-TIME TUNING OF INFERENCE SYSTEMS

(71) Applicant: RADWARE, LTD., Tel Aviv (IL)

(72) Inventors: Lev Medvedovsky, Netanya (IL); David Aviv, Tel Aviv (IL); Ehud Doron, Moddiin (IL); Asaf Oron, Even-Yehuda (IL); Yuriy Arbitman, Raanana (IL)

(73) Assignee: Radware, Ltd., Tel Aviv (IL)

( * ) Notice: Subject to any disclaimer, the term of this patent is extended or adjusted under 35 U.S.C. 154(b) by 158 days.

(21) Appl. No.: 15/483,398

(22) Filed: Apr. 10, 2017

(65) Prior Publication Data
US 2017/0302686 A1    Oct. 19, 2017

Related U.S. Application Data

(60) Provisional application No. 62/322,552, filed on Apr. 14, 2016.

(51) Int. Cl.
*H04L 29/06*    (2006.01)

(52) U.S. Cl.
CPC ...... *H04L 63/1416* (2013.01); *H04L 63/1458* (2013.01)

(58) Field of Classification Search
CPC ................. H04L 63/1416; H04L 63/1458
See application file for complete search history.

(56) References Cited

U.S. PATENT DOCUMENTS

| | | | | |
|---|---|---|---|---|
| 8,660,578 | B1 * | 2/2014 | Yang | G01S 5/0273 455/456.1 |
| 2002/0181624 | A1 * | 12/2002 | Gonzalez | H04L 25/03292 375/346 |
| 2005/0206650 | A1 * | 9/2005 | Nazzal | H04L 41/0631 345/594 |
| 2007/0150949 | A1 * | 6/2007 | Futamura | H04L 63/1416 726/22 |
| 2010/0027432 | A1 * | 2/2010 | Gopalan | H04L 41/142 370/252 |
| 2010/0082399 | A1 * | 4/2010 | Ghosh | G06Q 30/02 705/14.71 |
| 2014/0041032 | A1 * | 2/2014 | Scheper | H04L 63/14 726/23 |
| 2015/0229661 | A1 * | 8/2015 | Balabine | H04L 43/04 726/22 |
| 2016/0036837 | A1 * | 2/2016 | Jain | H04L 63/1416 726/23 |

\* cited by examiner

*Primary Examiner* — Mohammad A Siddiqi
(74) *Attorney, Agent, or Firm* — M&B IP Analysts, LLC

(57) ABSTRACT

A system and method for real-time tuning of inference systems based on quality of incoming data. The method comprises: periodically receiving traffic data collected by a plurality of collectors deployed in a network; determining at least a normalized variance of a current sample of the received traffic data; estimating, based in part on the normalized variance, a standard deviation of the received traffic data and a fading coefficient of a baseline filter; determining a current baseline value based on a previous baseline value, the fading coefficient, and the current sample of the traffic data; and dynamically setting at least one membership function of the inference system based in part on the current baseline value and the standard deviation.

18 Claims, 4 Drawing Sheets

SYSTEM AND METHOD FOR REAL-TIME TUNING OF INFERENCE SYSTEMS

CROSS-REFERENCE TO RELATED APPLICATIONS

This application claims the benefit of U.S. Provisional Application No. 62/322,552 filed on Apr. 14, 2016, the contents of which are hereby incorporated by reference.

TECHNICAL FIELD

The present disclosure relates generally to inference systems, and more specifically to inference engines utilized for traffic monitoring.

BACKGROUND

With the increasing use of computers in modern society, computer systems and networks have become increasingly subject to cyber-attacks intended to disrupt the systems, steal data, cause application defacement, manipulate behavior, or a combination of these. Accordingly, the field of cyber security has developed to combat such cyber-attacks.

Among others, such attacks currently include denial of service (DoS) and distributed DoS (DDOS) attacks, authorization attacks, worm propagation, network scanning, application scanning, and the like. For example, DoS and DDOS attacks dispatch large numbers of network packets or application requests to overload network resources, resulting in denial of services to legitimate users. As a further example, one type of a DoS attack is a UDP flood attack, where the attacker attempts to saturate a random port of a host in a protected network with UDP packets.

Existing cyber security solutions attempt to detect cyber-attacks using behavioral analysis. To this end, a baseline demonstrating normal behavior of a protected entity is determined, and any detected substantial deviation from the baseline indicates a potential attack. For example, an average UDP packets per second (PPS) received at a port of a protected entity can be determined as the baseline. Traffic with a UDP PPS significantly higher than the determined baseline can be determined as malicious.

Existing cyber security solutions for attack detection typically analyze incoming data purely from a quantitative point of view using baselines. As such, the baselines serve as the principal references for dynamic characteristics of the traffic. The quality of a baseline reference influences the accuracy of detection of abnormal behavior. The quality of a baseline is typically determined by the steadiness, smoothness, noise, and so on. On the other hand, a baseline should adequately represent the actual traffic trends. Thus, there is a certain tradeoff in intention to form steady and smooth baseline with minimal ripples still following average traffic temporal changes.

A baseline attack detection typically includes a set of threshold levels. Such levels are set based on statistics collected for network traffic, technical restrictions of networks and expected traffic characteristics. The collected statistics data is analyzed to determine the values of the baseline's levels. The statistics are continuously collected and analyzed, during peacetime, to provide adaptive baselines. Some threshold levels are set to default configurable values.

The analysis of the statistics collected is performed using digital filters. Examples for such filters include a moving average filter, an exponentially fading filter (a two taps infinite impulse response, also known as an IIR filter). The filters are often manually configured according to a user's experience. For example, an IIR filter can provide continuous averaging based on statistical weighting on collected statistics related to baseline parameters. The weights ensure that the influence of "old" collected samples decreases as they become more remote in time. In this example, the weights and a fading coefficient (a) of the IIR filter are configured by the user.

To allow accurate detection, a baseline should be adaptive to changes in the incoming traffic. The manual configuration may negatively affect the ability to determine an accurate and adaptive baseline. Further, due to the random nature of incoming data, baselines also demonstrate randomness with a probability distribution depending on both the input data and the features of the applied filter. Thus, manual configuration may reduce the quality of the baselines, leading to less accurate detection.

It would therefore be advantageous to provide a solution that would overcome the deficiencies of the prior art.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for real-time tuning of inference systems based on quality of incoming data. The method comprises: periodically receiving traffic data collected by a plurality of collectors deployed in a network; determining at least a normalized variance of a current sample of the received traffic data; estimating, based in part on the normalized variance, a standard deviation of the received traffic data and a fading coefficient of a baseline filter; determining a current baseline value based on a previous baseline value, the fading coefficient, and the current sample of the traffic data; and dynamically setting at least one membership function of the inference system based in part on the current baseline value and the standard deviation.

Certain embodiments disclosed herein also include a system for real-time tuning of an inference system based on traffic data, comprising: a processing circuitry; and a memory, the memory containing instructions that, when executed by the processing circuitry, configure the system to: periodically receive traffic data collected by a plurality of collectors deployed in a network; determine at least a normalized variance of a current sample of the received traffic data; estimate, based in part on the normalized variance, a standard deviation of the received traffic data and a fading coefficient of a baseline filter; determine a current baseline value based on a previous baseline value, the fading coefficient, and the current sample of the traffic data; and dynamically set at least one membership function of the inference system based in part on the current baseline value and the standard deviation.

Certain embodiments disclosed herein also include a method detecting abnormal behavior in a network, comprising: periodically receiving traffic data collected by a plurality of collectors deployed in a network; tuning, in real-time, at least one membership function of an inference system based on the received traffic data, wherein the tuning is based on a baseline value and a standard deviation of the received traffic data; and evaluating the received traffic data using the at least one membership function to detect abnormal behavior in the received traffic data.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
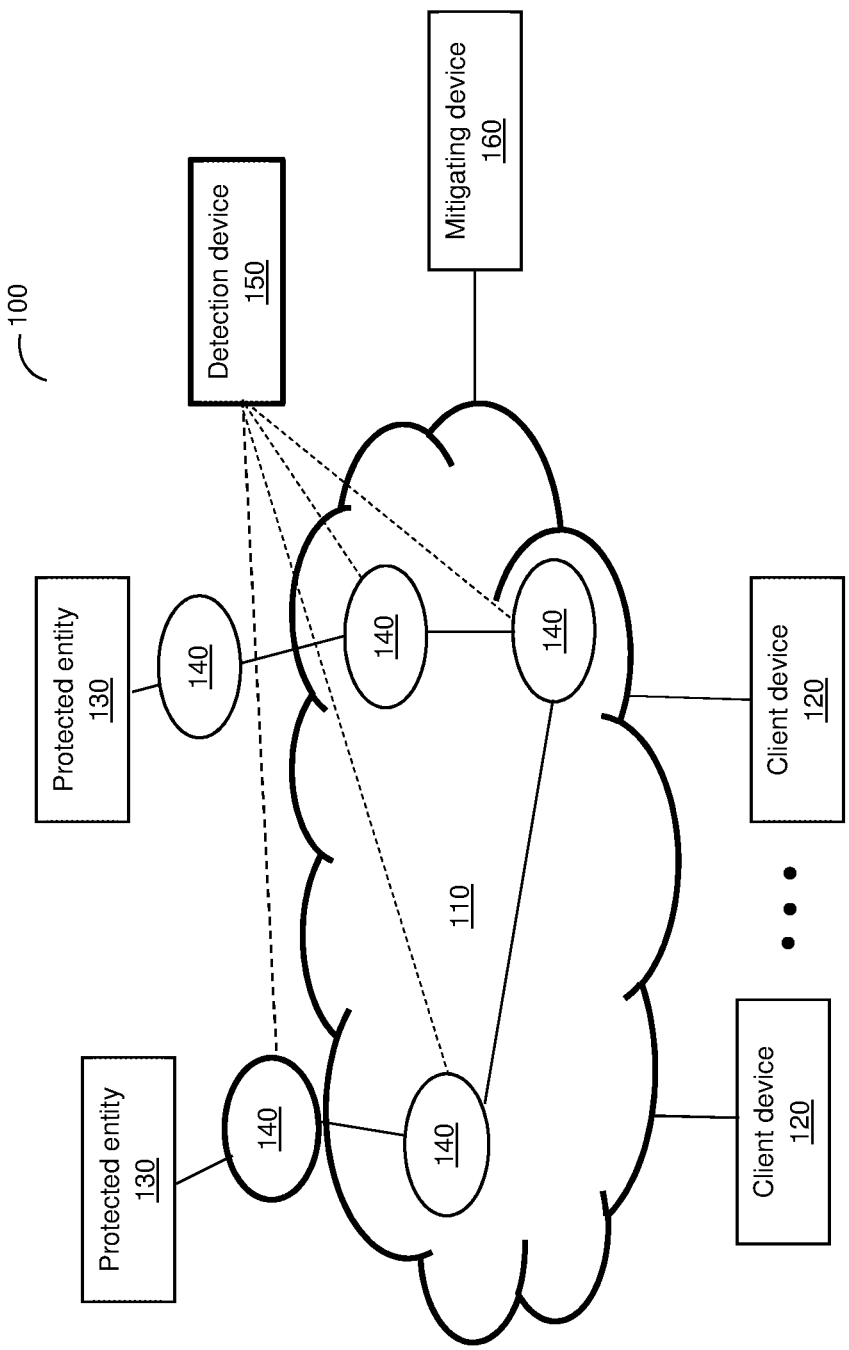
FIG. 1 is a diagram of a networked system utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

In an embodiment, various approaches discussed in detail herein below are utilized to estimate baseline values and various threshold levels of membership functions of inference systems. In an embodiment, the quality of a baseline is estimated based on its variance or normalized variance in the time domain. In another embodiment, the baseline is estimated based on a central moment of the probability distribution of the baseline's temporal values.

FIG. 1 is an example diagram of a networked system 100 utilized to describe the various disclosed embodiments. The networked system 100 includes a plurality of protected entities (collectively labeled as 130) and a plurality of client devices (collectively labeled as 120) communicatively connected to a network 110. The network 110 may include one or more different type of communication networks, such as a backbone network, one or more edge networks, or both.

In an example configuration, the network 110 may include any of or a combination of wide area networks (WANs), the Internet, an Internet service provider (ISP) backbone, local area networks (LANs), service provider backbones, datacenters, inter-datacenter networks, a private cloud, a public cloud, a hybrid cloud, and the like.

A client device 120 may be, for example, a smart phone, a tablet computer, a personal computer, a laptop computer, a notebook computer, a wearable computing device, or any device that can communicate with, for example, the network 110 and the protected entities 130. A protected entity 130 may include, for example, a web server, an application server, a database, an email server, or any virtual or physical computing and networking infrastructure.

According to the disclosed embodiments, the networked system 100 also includes a plurality of traffic collectors (collectively labeled as 140) communicatively connected to a detection device 150. In an embodiment, the detection device 150 can also be configured to operate as a traffic collector 140.

The traffic collectors 140 are configured to collect telemetry statistics, parameters, features (hereinafter "traffic parameters"), or a combination thereof, related to traffic flows through the network and their network elements (not shown). Example for network elements includes routers, switches, ADCs, load balancers, and the like. Specifically, in an embodiment, the traffic collectors 140 are configured to collect statistics, in real time, on traffic that is directed to protected entities 130, and to share the collected parameters with the detection device 150. The collected parameters can be sent to the detection device 150 as telemetries.

A traffic collector 140 may be a physical machine, a virtual machine, or a combination thereof. In some configurations, a traffic collector 140 can be deployed as part of the data-plane in a tap mode, and can be configured to monitor the traffic and to classify the traffic per flow. In other configurations, a traffic collector 140 is deployed out-of-path of traffic to and from protected applications. A traffic collector 140 can be realized as a deep packet inspection (DPI) engine, or any device or appliance designed to monitor traffic flows to and from the protected entities. Alternatively or collectively, a traffic collector can be utilized to collect and transmit telemetries (traffic parameters) by continuously collecting flows data from various network elements, such as a peer edge, a provider edge, and so on. Telemetries can be collected and communicated to the detection device 160 using, for example, flow protocols, such as NetFlow, sFlow, jFlow, IPFIX, and the like.

Examples for traffic parameters may include layer-4 (L4) parameters such as packet rate, packets per second, byte rate, byte per second, average packet size, new connections rate (new connections per second per application), concurrent connections per application (connections per application), average application flow duration, average application flow size, a L4 protocol type (e.g., TCP or UDP), a L4 destination port number, and the like. The traffic parameters may also include layer-7 (L7) traffic parameters, which may include an application name or identifier (ID) of the application (e.g., Gmail®, Skype®, YouTube®, etc.), an application protocol type (e.g., HTTP, SMTP, POP, FTP, etc.), a device type (e.g., Nokia®, iPhone®, Samsung®, etc.), an operating system (OS) type and version (e.g., Symbian®, Win8®, Android®, iOS6®, etc.), a URL range (or top level domain, etc.), a browser type, any metadata (e.g., video codec, user ID, etc.) associated with an application, and so on.

According to various embodiments disclosed herein, the detection device 150 is configured to monitor the traffic directed to at least a protected entity 130, to analyze the traffic, and to determine abnormal traffic behavior. In an embodiment, the traffic monitoring is performed using traffic parameters received from the collectors 140. The detection device 150 is further configured to alert a mitigation device 160 of detected cyber-attacks.

In an embodiment, the mitigation device 160 can execute one or more mitigation actions to mitigate the detected attacks. Examples for mitigation actions include blocking traffic, redirecting traffic, and regulating (decreasing bandwidth) of traffic directed to a protected entity 130 that is under attack. The types of attacks that can be detected and mitigated by the detection device 150 and mitigation device 160 may include, but are not limited to, DoS, DDoS, bot activity, chatty activity, worm propagation, network scanning, application scanning, and the like.

In an embodiment, the analysis and the detection of abnormal traffic behavior and, hence, of cyber-attacks, is performed using fuzzy logic inference system (FIS) engines (not shown in FIG. 1) that are tuned in real-time based on the received traffic parameters. Specifically, in an embodiment, a baseline on which each FIS engine is utilized in the detection device 150 is tuned based on traffic parameters received in real-time. The update of the baseline is performed based on the received traffic parameters (incoming data) and the current baseline. In an embodiment, discussed in detailed below, the quality of the baseline is estimated based on its normalized variance in the time domain.

Figure 2:
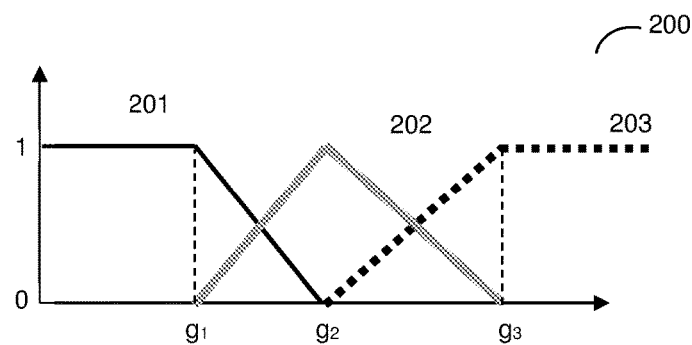
FIG. 2 are example membership functions for fuzzy analysis of traffic parameters by a FIS engine.

As demonstrated in FIG. 2, a FIS engine uses input membership functions 200 for fuzzy analysis of traffic parameters. In the example FIG. 2, the function 201 is a non-attack membership function, the function 202 is a potential attack membership function, and the function 203 is an attack membership function 203. The membership functions 200 determine a deterministic score, which is a degree of fulfillment (DoF). The DoF defines the behavior group that a set of observed traffic parameters belong to. The DoF is compared to a certain baseline threshold levels. Such levels are shown as $g_1$ for function 201, $g_2$ for function 202, and $g_3$ for function 203. In existing solutions, one or more such threshold values are manually determined by a user. For example, $g_3$ is a pre-defined maximum value for a specific traffic parameter, $g_1$ is a normal average value of the parameter, and $g_2$ is the geometric mean value of $g_1$ and $g_3$.

According to the disclosed embodiments, the values $g_1$, $g_2$, and $g_3$ are dynamically and adaptively set based on the quality of incoming data, i.e., received traffic parameters. This ensures steadiness of the baseline and the FIS engine, and thereby an accurate detection. As will be discussed in more detail below, according to the disclosed embodiments, the baseline threshold levels ($g_1$, $g_2$, and $g_3$) for the membership functions of a FIS engine are set based on a computed normalized variance of the incoming data (traffic parameters) and the current baseline.

Returning to FIG. 1, any decision of a FIS engine triggers the detection device 150 to generate an alert, to cause the mitigation device 160 to execute one or more mitigation action to block the traffic, or both.

It should be noted that a single detection device 150 and a single mitigation device 160 are shown in FIG. 1 merely for simplicity purposes and without limitation on the disclosed embodiments. In some deployments, multiple devices 150 and 160 can be utilized. Such deployments allow for elastic scalability, redundancy, and high availability. Further, in some embodiments, the detection and mitigation devices can be integrated in the same system.

Figure 3:
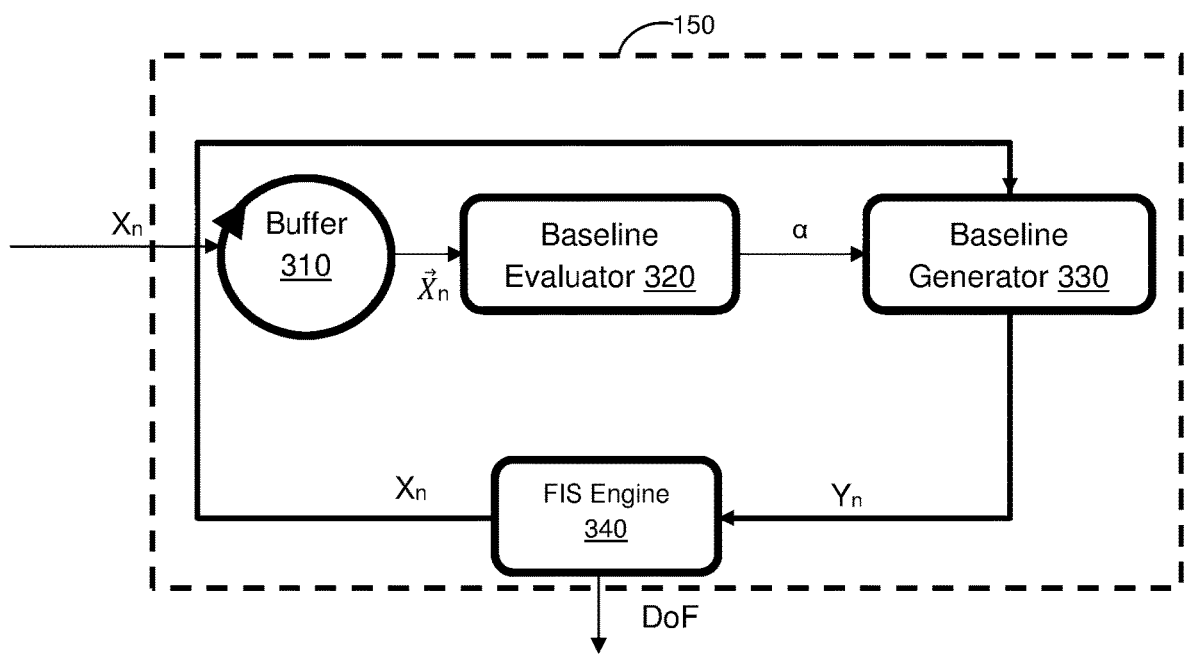
FIG. 3 is block diagram illustrating the flow of data in the detection device according to an embodiment.

FIG. 3 is an example block diagram illustrating the flow of data in the detection device 150 according to an embodiment. The detection device 150 includes a buffer 310, a baseline evaluator 320, a baseline generator 330, and a FIS engine 340.

The buffer 310 is configured to temporarily buffer traffic parameters received from the traffic collectors 140. The traffic parameters are received at predefined time intervals. The buffer 310 outputs a vector of the input traffic parameter $\bar{X}$. In an embodiment, the buffer can be realized as a circular buffer or any equivalent type of data structure. In some configurations, the buffer 310 is optional, and learning of statistical properties of traffic is performed online.

The baseline generator 330 is configured to compute a baseline, and hence the membership functions' threshold levels (e.g., $g_1$, $g_2$, and $g_3$, shown in FIG. 2), based on the input traffic parameters $X_n$ and one or more coefficients set by the baseline evaluator 320. In an embodiment, the baseline generator 330 is realized as a moving average filter, or an exponentially fading IIR filter.

The baseline evaluator 320 is configured to estimate the fading coefficient ($\alpha$) of a filter (e.g., IIR filter) implemented by the baseline generator 320 and a standard deviation $\sigma_X$ of the incoming traffic parameters $X_n$. The fading coefficient ($\alpha$) depends on the data variance, thus the expected distribution value $Y_n$ of the baseline remains steady regardless of the momentary magnitude of the input data.

The baseline value $Y_n$ is determined as:

$$Y_n = (1-\alpha)Y_{n-1} + \alpha X_n \qquad \text{Equation (1)}$$

where $X_n$ and $Y_n$ are, respectively, the input traffic parameters at the n-th observation and the baseline values after the $n^{th}$ update.

In an embodiment, the fading coefficient ($\alpha$) can be estimated as follows:

$$\alpha = \frac{2\hat{\sigma}_Y^2}{\hat{\sigma}_X^2 + \hat{\sigma}_Y^2} \qquad \text{Equation (2)}$$

where $\hat{\sigma}_X^2$ is the normalized variance of traffic parameters ($X_n$) currently stored in the buffer 320, and $\hat{\sigma}_Y^2$ is the desired normalized variance of the baseline $Y_n$. In an example embodiment, the normalized variance $\hat{\sigma}_X^2$ can be computed as follows:

$$\hat{\sigma}_X^2 = \text{var}(X/X_\tau) \qquad \text{Equation (3)}$$

Wherein $X_\tau$ is the mean value of $X_n$. As noted above, in some embodiments, the detection engine can be realized without a circular buffer. In such embodiments, the baselines and threshold levels are recursively computed online. To this end, estimation (learning) of the mean and standard deviation values can be performed as follows:

$$Y \leftarrow (1-\alpha)Y + aX \qquad \text{Equation (4.1)}$$

$$Y_0 = (X_0 + X_{-1})/2 \qquad \text{Equation (4.2)}$$

$$\sigma_X^2 \leftarrow (1-\alpha)\sigma_X^2 + \alpha(X-Y) \qquad \text{Equation (5.1)}$$

$$(\sigma_X^2)_0 = (X_0 - X_{-1})^2/4 \qquad \text{Equation (5.2)}$$

where, $Y_0$ are $X_0$ are, respectively, the initial values of the traffic parameter and baseline. In another embodiment, other initial values can be selected. Additionally, $\sigma_X^2$ is the variance of the traffic parameters and $(\sigma_X^2)_0$ is the initial value of the variance. In another embodiment, other initial values can be selected.

It should be noted that mean and variance of traffic parameters describe the normal and abnormal behavior of the traffic. In an embodiment, the learned variance of the traffic parameters is utilized to determine the threshold levels of membership functions. Specifically, such values can be determined as a standard deviation from the baseline's current value. The standard deviation is updated with every new observation of the traffic parameters. Therefore, the baseline and the functions' threshold levels change in response to changes in the traffic, and particularly to changes in the input traffic parameters. In an embodiment, the standard deviation $\sigma_X$ is defined as follows:

$$\sigma_X = \hat{\sigma}_X X_\tau \qquad \text{Equation (6)}$$

where, $\hat{\sigma}_X$ is the root-square value of the normalized variance $\hat{\sigma}_X^2$ (defined in Equation 3).

In an embodiment, the membership functions' threshold levels are adaptively set based on the standard deviation $\sigma_X$ and the baseline $Y_n$. For example, for the membership functions discussed with reference to FIG. 2, the threshold levels $g_1$, $g_2$, and $g_3$, respectively, of the non-attack membership function 201, the potential attack membership function 202, and the attack membership function 203, can be set as follows:

$$\begin{cases} g_1 = Y_n \\ g_2: |Y_n - g_2| = \kappa \sigma_X \\ g_3: |Y_n - g_3| = \lambda \sigma_X \end{cases} \qquad \text{Equation (7)}$$

It should be noted that the threshold levels ($g_2$ and $g_3$) are always on the same side of the baseline value ($g_1=Y_n$), which may be either the lower or upper side of the baseline value, depending on the parameter under consideration. As an example, for a byte rate parameter, the threshold levels ($g_2$ and $g_3$) may both be above the baseline value ($g_1=Y_n$). For other parameters where small values can be suspicious, the threshold levels ($g_2$ and $g_3$) may both be under the baseline value (g1=Yn). For parameters (e.g., an average packet size) that can be qualified as suspicious in both cases of significant deviation (too high and too low), an auxiliary parameter is utilized. In this example, only high excess can be qualified as suspicious. As an example, an auxiliary parameter can be a sum of the original normalized parameter and its inverse value. That is, the auxiliary parameter (V) is defined as follows:

$$V = \frac{X}{Y} + \frac{Y}{X}, \qquad \text{Equation (8)}$$

where Y is the baseline of the parameter X.

The values "κ" and "λ" in Equation 7 are preconfigured constant values. For example, κ and λ may be set respectively set to 3 and 5. In one configuration, λ>κ. It should be further noted that the input traffic parameters are products of many independent sources. However, in accordance with the Central limit theorem, features of the traffic parameters approximately obey to normal distribution. Therefore, any excess out of several values of the standard deviation $\sigma_X$ from the baseline's current value may be considered as abnormal behavior.

The standard deviation $\sigma_X$ is modified in response to the incoming traffic parameters ($X_n$). In some configurations, not all incoming traffic parameters $X_n$ are considered, and particularly those that demonstrate abnormal behavior are ignored.

The FIS engine 340 is configured to adapt the membership functions (e.g., functions 201, 202, and 203, FIG. 2) for one or more types of traffic parameters. In some configurations, the adaptation relates to one or more types of packets (e.g., UDP, TCP, ICMP). To perform this adaptation, the FIS engine 340 is configured to use the threshold levels (and baseline) determined by the baseline generator 330. To adapt the membership functions for a traffic parameter (e.g., packet per second of a UDP packet), the threshold levels $g_1$, $g_2$, and $g_3$ are set as discussed above.

In an embodiment, the FIS engine 340 is configured to temporarily (e.g., for 1 second) aggregate traffic parameters ($X_n$) received, in real-time, and to evaluate (fuzzification) each aggregated parameter using the appropriate adapted membership function. The result of the evaluation is a DoF for each parameter. The DoF is a value between 0 and 1 indicative of a level of partial membership of an element in a set. The operation of the FIS engine 340 is further discussed in U.S. Pat. No. 7,681,235, assigned to the common assignee, which is incorporated herein by reference.

In some embodiments, based on the resulting DoF, it is determined if a potential attack has been detected and whether to trigger a mitigation action. For example, if the DoF (score) of the attack membership function 203 is 1, then it is determined that the input traffic parameters demonstrate abnormal behavior indicating an attack.

It should be noted that the detection device 150 typically includes a plurality of FIS engines configured to handle different traffic parameters, different protocols, or both. Further, a baseline generator 330 can serve one or more FIS engines. In some configurations, the detection device 150 may include a decision engine (not shown) that triggers an alert based on output (degree of membership) computed by a plurality of FIS engines.

The various elements of the detection device 150 can be realized as hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

Figure 4:
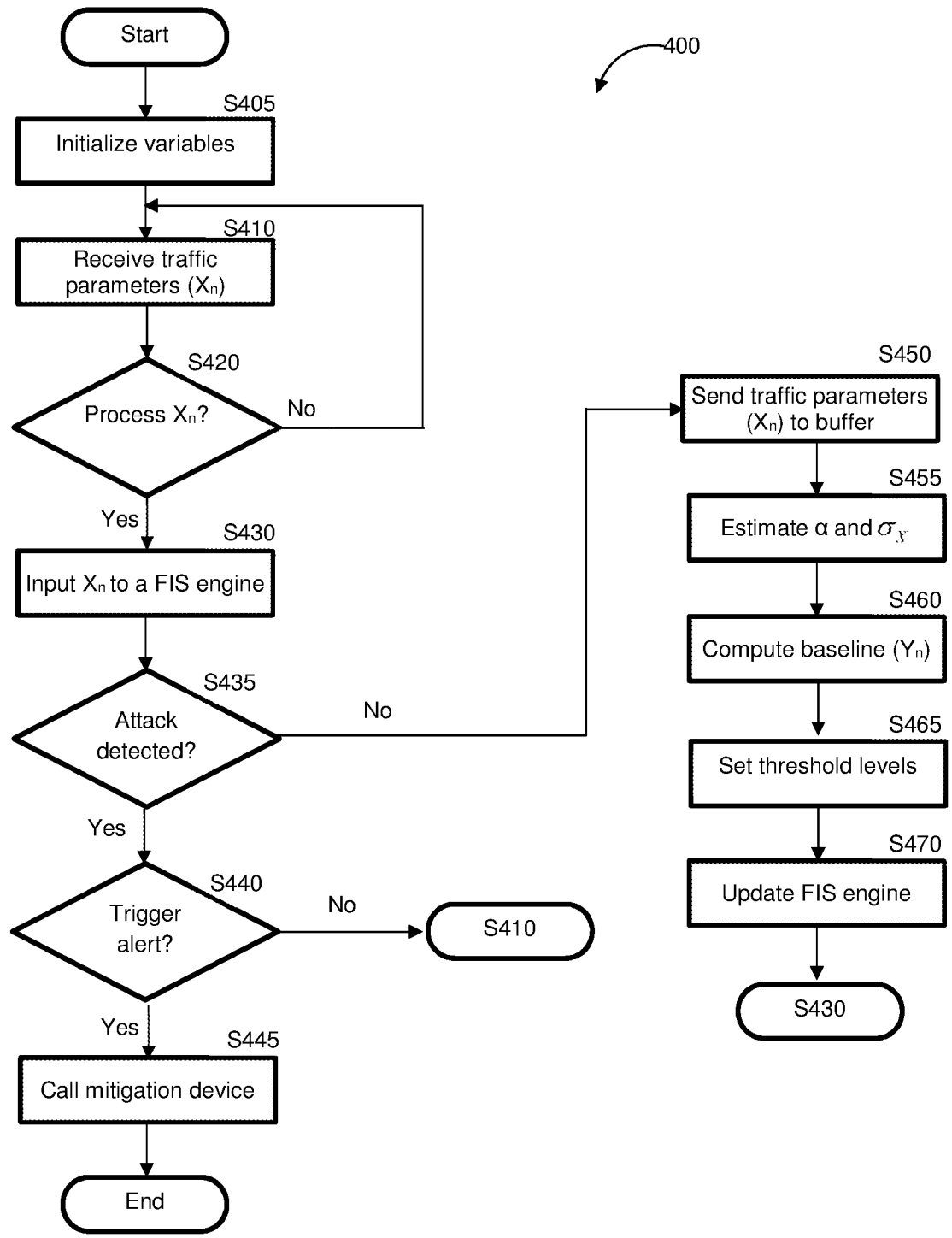
FIG. 4 is a flowchart illustrating the operation of the detection device according an embodiment.

FIG. 4 shows an example flowchart 400 illustrating the operation of the detection device 150 according an embodiment. Specifically, the flowchart demonstrates the setting of a baseline and threshold levels for membership functions utilized by a FIS engine (e.g., the FIS engine 340, FIG. 3).

At optional S405, certain variables are set to their initial values. In an embodiment, the variables include sensitivity coefficients, such as $K_{quiet}$ and $K_{alert}$. The $K_{quiet}$ coefficient allows for determination of whether a currently received traffic parameter ($X_n$) should be considered, for example, if the value $X_n$ is relatively low compared to its maximum value. $K_{alert}$ allows for determination of whether an alert should be trigged and determined based on a maximum value of a traffic parameter. In some embodiments, the sensitivity coefficients $K_{quiet}$ and $K_{alert}$ are optional. The initialized variables may also include the standard deviations for the baseline ($Y_n$) and the incoming traffic parameters ($X_n$). These variables may be initialized based on their previously estimated values (instead of Equations 4.2 and 5.2).

At S410, traffic parameters are periodically received. Specifically, the traffic parameters are received at predefined time intervals. The received traffic parameters are detected as $X_n$, wherein 'n' designates the current observation. The traffic parameters may include layer-4 (L4) parameters, such as packet rate (e.g., packets per second), a byte rate (e.g., byte per second), an average packet size, a new connections rate, a number of concurrent connections per application, an average application flow duration, an average application flow size, a L4 protocol type (e.g., TCP or UDP), a L4 destination port number, and the like. The traffic parameters may also include layer-7 (L7) traffic parameters, such as an application name or identifier (ID) of the application, an application protocol type, a device type, an operating system (OS) type and version, a URL range, a browser type, any metadata associated with an application, and so on.

At optional S420, it is checked if the received traffic parameters $X_n$ should be processed and, if so, execution continues with S430; otherwise, execution returns to S410. In an embodiment, the check is made based on the value of a received traffic parameter, the maximum value previously set for that parameter, and the value for $K_{quiet}$. For example, $X_n$ is processed when $X_n > K_{quiet} * \max(Y_{n-1})$.

At S430, the received traffic parameters ($X_n$) are input to a FIS engine (e.g., the engine 340, FIG. 3). It should be noted that the FIS engine can determine the DoF for one traffic parameter or for a group of parameters. At S435, it is checked if the FIS engine determined a DoF that may indicate a potential attack. For example, if the DoF for an attack membership function 203 (FIG. 2) is greater than 0.95 (where 1 is the maximum allowable DoF score), an attack may be detected. If S435 results with a Yes answer, execution continues with S440; otherwise, at S450, the received traffic parameters $X_n$ are input to a buffer (e.g., the buffer 310, FIG. 3). S435 is performed in order to determine that attack data is factored or learned when determining the baseline $Y_n$.

At S440, it is checked if an attack alert should be triggered. The decision at S440 may be based on previous DoF scores determined by the FIS engine or engines in the detection device 140. In an embodiment, the decision is based on the alert coefficient $K_{alert}$ that is utilized to average previously DoF scores. If S440 results with a Yes answer, execution proceeds with S445, where a mitigation device is called to mitigate the detected attack. In an embodiment, S445 may include generating an alert indicating a potential attack. If S440 results with a No answer, execution returns to S410.

As noted above, the FIS engine operates by adoption of member functions to received input parameters based on baseline levels. According to an embodiment, the levels are determined based on the variance of a vector of the input traffic paraments $\vec{X}$, the standard divisions of the input parameters and baselines, and a fading coefficient.

Specifically, at S450, the vector of the input traffic paraments $\vec{X}$ and the normalized variance $\hat{\sigma}_X^2$ of the vector are provided, for example, by a circular buffer or using the recursive operation (for example defined above in Equations 4 and 5). The normalized variance $\hat{\sigma}_X^2$ is computed based on Equation 3.

At S455, the standard deviation $\sigma_X$ and the fading coefficient α are estimated or otherwise computed. In an embodiment, the standard deviation $\sigma_X$ is computed using Equations 5 or 6 above, while the fading coefficient σ is estimated using Equation 2. In an embodiment, the current estimated fading coefficient σ and standard deviation $\sigma_X$ are saved for future use, e.g., for initializing variables.

At S460, the current baseline value $Y_n$ is computed using the previous baseline value $Y_{n-1}$, the fading coefficient α, and a current traffic parameter $X_n$. In an embodiment, the current baseline value $Y_n$ is computed using Equation 1, above. At S465, the threshold levels of the FIS engine's membership functions are set using the current baseline value $Y_n$ and the standard deviation $\sigma_X$. An example for threshold levels $g_1$, $g_2$, and $g_3$ for the membership functions is provided above.

At S470, the FIS engine is set with the threshold levels $g_1$, $g_2$, and $g_3$, i.e., with the baseline value that would be considered as indicating abnormal behavior. It should be noted that the process described herein is performed as long as new traffic parameters are received. It should be further noted that the baseline is updated with the received traffic parameters (that are not abnormal) and, thus, the baseline is adaptive to changes in the traffic. In addition, the disclosed embodiments allow tuning of a baseline smoothing filter by estimating the quality of a baseline based, in part, on a normalized variance of the baseline in the time domain.

Figure 5:
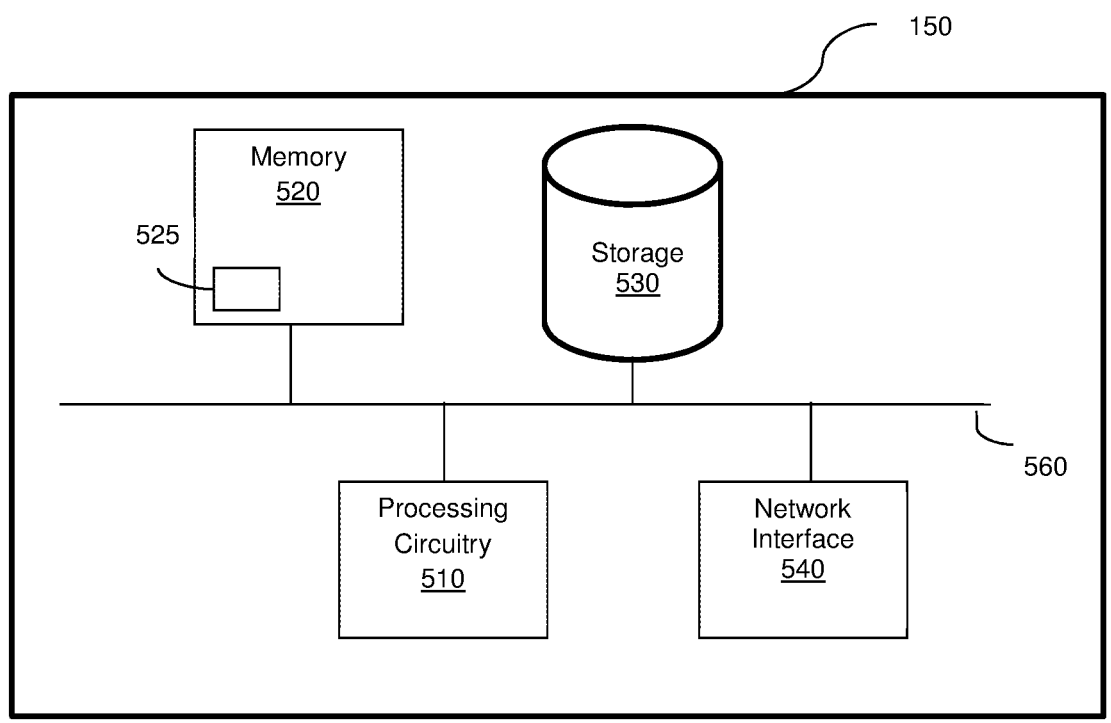
FIG. 5 is an example block diagram of the detection device according to an embodiment.

FIG. 5 is an example block diagram of the detection device 150 according to an embodiment. The detection device 150 includes a processing circuitry 510 coupled to a memory 520, a storage 530, and a network interface 540. In an embodiment, the components of the detection device 150 may be communicatively connected via a bus 560.

The processing circuitry 510 may be realized as one or more hardware logic components and circuits. For example, and without limitation, illustrative types of hardware logic components that can be used include FPGAs, ASICs, ASSPs, SOCs, general-purpose microprocessors, microcontrollers, DSPs, and the like, or any other hardware logic components that can perform calculations or other manipulations of information.

The memory 520 may be volatile (e.g., RAM, etc.), non-volatile (e.g., ROM, flash memory, etc.), or a combination thereof. In one configuration, computer readable instructions to implement one or more embodiments disclosed herein may be stored in the storage 530. In an embodiment, the buffers, such are circular buffers are realized in the memory 520.

In another embodiment, the memory 520 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 510 to perform the various processes described herein. Specifically, the instructions, when executed, cause the processing circuitry 510 to perform out-of-path detection and mitigation of cyber-attacks, as discussed hereinabove. In a further embodiment, the memory 520 may further include a memory portion 525 including the instructions.

The storage 530 may be magnetic storage, optical storage, and the like, and may be realized, for example, as flash memory or other memory technology, CD-ROM, Digital Versatile Disks (DVDs), hard-drives, SSD, or any other medium which can be used to store the desired information. The storage 530 may store computed variables, membership functions, and the like.

The network interface 540 allows the detection device 150 to communicate with the traffic collectors 140 (FIG. 1) to receive parameters related to traffic behavior. The network interface 540 further allows the detection device 150 to communicate with the mitigation device 160.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for real-time tuning of, and using, an inference system based on traffic data, comprising:
    periodically receiving traffic data collected by a plurality of collectors deployed in a network;
    determining at least a normalized variance of a current sample of the received traffic data;
    estimating a desired normalized variance of a baseline value;
    estimating, based on the normalized variance, a standard deviation of the received traffic data and a fading coefficient of a baseline filter wherein the fading coefficient is estimated as a function of the desired normalized variance of the baseline value and the normalized variance of the received traffic data and wherein the function is:

$$\alpha = \frac{2\hat{\sigma}_Y^2}{\hat{\sigma}_X^2 + \hat{\sigma}_Y^2};$$

wherein $\alpha$ is the fading coefficient, $\hat{\sigma}_X^2$ is the normalized variance of received traffic data, and $\hat{\sigma}_Y^2$ is the desired normalized variance of the baseline value;
    determining a current baseline value based on a previous baseline value, the fading coefficient, and the current sample of the traffic data;
    dynamically setting at least one membership function of the inference system based on the current baseline value and the standard deviation;
    evaluating the received traffic data using the at least one membership function to detect abnormal behavior in the received traffic data; and
    causing a mitigation action to be taken in response to detection of abnormal behavior.

2. The method of claim 1, further comprising:
    vectorizing, using a circular buffer, the received traffic data to create a vector of the current sample of the received traffic data.

3. The method of claim 2, further comprising:
    determining if the received traffic data demonstrates normal behavior; and
    buffering the received traffic data demonstrating normal behavior in the circular buffer such that the current baseline value characterizes a normal behavior.

4. The method of claim 2, wherein the normalized variance is a variance computed over the vector of the current sample of the received traffic data.

5. The method of claim 1, wherein estimating the standard deviation further comprises:
    estimating a mean value of the current sample of the received data; and
    computing the estimated standard deviation as a product of the estimated mean value and a square-root of the normalized variance.

6. The method of claim 1, wherein determining the current baseline value further comprises:
    estimating a baseline function, wherein the baseline function is:
    $Y_n = (1-\alpha)Y_{n-1} + aX_n$; wherein $Y_n$ is the current baseline value, $Y_{n-1}$ is a previous baseline value, $\alpha$ is the fading coefficient, and $X_n$ is the current sample of the traffic data.

7. The method of claim 1, wherein the received traffic data includes statistical data related to at least one of: layer-4 traffic parameters, layer-7 traffic parameters, and data communication protocols.

8. The method of claim 7, wherein the layer-4 parameters include at least one of: a packet rate, a byte rate, an average packet size, a new connections rate, a number of concurrent connections per application, an average application flow duration, an average application flow size, a protocol type, a and destination port number.

9. The method of claim 7, wherein the layer-7 parameters include at least one of: an application name, an application protocol type, a device type, an operating system (OS) type and version, a URL range, a browser type, and metadata associated with an application.

10. The method of claim 1, wherein the abnormal behavior in the received traffic data indicates a potential cyber-attack.

11. The method of claim 1, wherein the baseline line filter is an infinite impulse response filter.

12. A non-transitory computer readable medium having stored thereon instructions for causing a processing circuitry to execute the method of claim 1.

13. A system for real-time tuning of an inference system based on traffic data, comprising:
   a processing circuitry; and
   a memory, the memory containing instructions that, when executed by the processing circuitry, configure the system to:
   periodically receive traffic data collected by a plurality of collectors deployed in a network;
   determine at least a normalized variance of a current sample of the received traffic data;
   estimate a desired normalized variance of a baseline value;
   estimate, based on the normalized variance, a standard deviation of the received traffic data and a fading coefficient of a baseline filter wherein the fading coefficient is estimated as a function of the desired normalized variance of the baseline value and the normalized variance of the received traffic data and wherein the function is:

$$\alpha = \frac{2\hat{\sigma}_Y^2}{\hat{\sigma}_X^2 + \hat{\sigma}_Y^2};$$

wherein $\alpha$ is the fading coefficient, $\hat{\sigma}_X^2$ is the normalized variance of received traffic data, and $\hat{\sigma}_Y^2$ is the desired normalized variance of the baseline value;
   determine a current baseline value based on a previous baseline value, the fading coefficient, and the current sample of the traffic data; and
   dynamically set at least one membership function of the inference system based on the current baseline value and the standard deviation evaluate the received traffic data using the at least one membership function to detect abnormal behavior in the received traffic data; and
   cause a mitigation action to be taken in response to detection of abnormal behavior.

14. The system of claim 13, wherein the system is further configured to:
   vectorize, using a circular buffer, the received traffic data to create a vector of the current sample of the received traffic data.

15. The system of claim 14, wherein the system is further configured to:
   determine if the received traffic data demonstrates normal behavior; and
   buffer the received traffic data demonstrating normal behavior in the circular buffer such that the current baseline value characterizes a normal behavior.

16. The system of claim 14, wherein the normalized variance is a variance computed over the vector of the current sample of the received traffic data.

17. The system of claim 13, wherein the system is further configured to:
   estimate a mean value of the current sample of the received data; and
   compute the estimated standard deviation as a product of the estimated mean value and a square-root of the normalized variance.

18. The system of claim 13, wherein the system is further configured to:
   estimate a baseline function, wherein the baseline function is:
   $Y_n = (1-\alpha)Y_{n-1} + \alpha X_n$; wherein $Y_n$ is the current baseline value, $Y_{n-1}$ is a previous baseline value, $\alpha$ is the fading coefficient, and $X_n$ is the current sample of the traffic data.

* * * * *